United States Patent [19]

Manandhar et al.

[11] Patent Number: 5,744,524
[45] Date of Patent: Apr. 28, 1998

[54] POLYMER MODIFIED ASPHALTIC COMPOSITIONS WITH IMPROVED DISPERSION AND PRODUCTS THEREFROM

[75] Inventors: Eraj D. Manandhar, West Haven, Conn.; Arthur M. Usmani, Indianapolis, Ind.

[73] Assignee: Bridgestone/Firestone, Inc., Akron, Ohio

[21] Appl. No.: 816,672

[22] Filed: Mar. 13, 1997

Related U.S. Application Data

[63] Continuation of Ser. No. 628,974, Apr. 8, 1996, abandoned, which is a continuation of Ser. No. 359,988, Dec. 20, 1994, abandoned.

[51] Int. Cl.$^6$ ............................................. C08L 95/00
[52] U.S. Cl. ................................... 524/70; 524/59
[58] Field of Search ........................ 524/59, 68, 69, 524/70, 71; 428/291, 489

[56] References Cited

U.S. PATENT DOCUMENTS

| | | | |
|---|---|---|---|
| H1250 | 11/1993 | Gilmore et al. | 524/68 |
| 3,978,014 | 8/1976 | Van Beem et al. | 524/68 |
| 4,000,140 | 12/1976 | Tierney | 524/69 |
| 4,032,491 | 6/1977 | Schoenke | 524/68 |
| 4,129,542 | 12/1978 | Metheson et al. | 524/70 |
| 4,148,780 | 4/1979 | Blümel et al. | 524/62 |
| 4,263,186 | 4/1981 | Blüemel | 524/59 |
| 4,273,685 | 6/1981 | Marzocchi et al. | 523/150 |
| 4,282,127 | 8/1981 | Desgouilles | 524/68 |
| 4,316,829 | 2/1982 | Roberts | 525/54.5 |
| 4,368,228 | 1/1983 | Gorgati | 428/489 |
| 4,385,142 | 5/1983 | Bohm et al. | 524/70 |
| 4,444,947 | 4/1984 | Harrington et al. | 525/54.5 |
| 4,595,636 | 6/1986 | Wiercinski et al. | 524/69 |
| 4,600,635 | 7/1986 | Wiercinski et al. | 428/220 |
| 4,659,381 | 4/1987 | Walters | 106/18.16 |
| 4,659,389 | 4/1987 | Wombles et al. | 106/279 |
| 4,732,925 | 3/1988 | Davis | 524/426 |
| 4,895,754 | 1/1990 | Graham et al. | 428/489 |
| 5,206,276 | 4/1993 | Lee, Jr. | 524/151 |
| 5,328,943 | 7/1994 | Isobe et al. | 524/70 |

FOREIGN PATENT DOCUMENTS

| | | | |
|---|---|---|---|
| 341379 | 11/1989 | European Pat. Off. | 524/68 |
| 0 345 402 A1 | 6/1988 | France | C08L 95/00 |
| 57-85855 | 5/1982 | Japan | C08L 95/00 |

OTHER PUBLICATIONS

"Firebrake® ZB Zinc Borate the Unique Multifunctional Additive" by Shen, *Plastics Compounding*, 12 pgs. (1985).
"Modified Bitumens Containing Thermoplastic Polymers", by Piazza et al., Presented at the International Symposium on Roofs, pp. 994–1005 (Nov. 1978).
"The Role of Bitumen in Blends with Thermoplastic Rubbers for Roofing Applications" by Gooswilligen et al., Roofing & Waterproofing, International Waterproofing Association, London 1986, pp. 45–52.
"Will toxicity concerns doom workhorse flame-retardant systems" by Wood, *Modern Plastics*, May 1990, pp. 40–44.
"Zinc Borate as a Flame Retardant, Smoke Suppressant, and Afterglow Suppressant" by Shen, Fire Retardant Chemical Association, Mar. 1984, pp. 1–28.

*Primary Examiner*—Peter A. Szekely
*Attorney, Agent, or Firm*—Frank J. Troy, Sr.

[57] ABSTRACT

An asphaltic compound according to the invention includes from about 70 to about 45 parts by weight of asphalt; from about 15 to about 25 parts by weight of a polymer modifier for said asphalt; from about 15 to about 25 parts by weight of a filler; and, from about 0.1 to about 5 parts by weight of a dispersing agent. The dispersing agent can be selected from the group consisting of stearic acid, tri(dioctyl) pyrophosphate titanate, tri(dioctyl) pyrophosphate-O, neoalkoxy tridodecylbenzenesulfonyl titanate, lecithin, aluminum stearate, maleic anhydride-modified ethylene/alpha-olefin copolymer, maleic anhydride grafted propylene-ethylene copolymer, ethoxylated alcohol, and mixtures thereof.

24 Claims, No Drawings

POLYMER MODIFIED ASPHALTIC COMPOSITIONS WITH IMPROVED DISPERSION AND PRODUCTS THEREFROM

This application is a continuation of application Ser. No. 08/628,974, filed Apr. 8, 1996, now abandoned, which is a file wrapper continuation of U.S. application Ser. No. 08/359,988 filed Dec. 20, 1994, now abandoned.

TECHNICAL FIELD

The present invention relates to a modified asphalt-based material suitable, for example, for preparing a membrane sheeting useful for roofing purposes. More particularly, the invention relates to an asphaltic composition as above having improved dispersion of the compound components and to an article having improved stability and surface properties. Specifically, the invention relates to a polymer modified asphalt composition which has included therein an amount of a dispersing agent to provide the improved properties.

BACKGROUND OF THE INVENTION

Asphaltic compounds have use in a wide variety of applications including, for example, the formation of roof sheeting. Asphalt roof sheeting is typically applied as a single ply roofing membrane for industrial and commercial flat roofs. These membranes are usually processed into sheeting rolls and applied to roofs in long strips.

Asphaltic compounds are normally a polymer modified asphalt which is extended with fillers to reduce cost or to provide certain desired properties, e.g., strength. Such fillers are normally dispersed into molten polymer modified asphalt at elevated temperatures during mechanical dispersion operations. This dispersion has proven to be rather difficult to achieve. Of course, the better the dispersion of the components within the compound the better the compound will perform for its intended use. However, it has been found that with conventional processing equipment and techniques, the formation of useful dispersions takes an intensive amount of mechanical action which is both energy and time consuming. One of the particular problems noted with the state of the technology prior to the present invention, is that fillers such as calcium carbonate are not wetted easily by modified asphalt. Hence, the mixing or dispersing time is long and the resultant compound normally lacks the desired uniformity of dispersion. Longer mixing times means a waste of energy, an increase in emissions, and lower productivity. A need exists, therefore, for a polymer modified asphaltic composition with good dispersion characteristics.

According to the present invention, this need is met. More particularly, a dispersing agent is added to an otherwise conventional asphaltic compound. The result is improved dispersion of the compound components and also improved characteristics in a product formed therefrom. These and other advantages of the invention will be further explored hereinbelow.

SUMMARY OF INVENTION

It is therefore, an object of the present invention to provide an asphalt material useful, for example, in formation of a roofing membrane or sheeting.

It is another object of the present invention to provide an asphaltic compound with improved component dispersion.

It is a further object of the present invention to provide an article formed from an asphaltic compound as above, having improved characteristics including improved dimensional and thermal stability, decreased processing times, improved surface sealing characteristics and the like.

At least one or more of the foregoing objects of the present invention, together with the advantages thereof over existing asphaltic compounds, which shall become apparent from the specification which follows, are accomplished by the invention as hereinafter described and claimed.

In general, an asphaltic compound according to the present invention includes asphalt, a polymer asphalt modifier, a filler and a dispersing agent. The polymer asphalt modifier can be selected from the group consisting of polypropylene, polypropylene-ethylene copolymers, thermoplastic olefins and mixtures thereof. The filler can be selected from the group consisting of calcium carbonate, talc, calcium borate, silica, silicates, clays, treated clays, and mixtures thereof. The dispersing agent can be selected from the group consisting of stearic acid, tri(dioctyl) pyrophosphate titanate, tri(dioctyl) pyrophosphate-O, neoalkoxy tri-dodecylbenzenesulfonyl titanate, lecithin, aluminum stearate, maleic anhydride (MAH)-modified ethylene/alpha-olefin copolymer, maleic anhydride grafted propylene-ethylene copolymers, ethoxylated alcohol, and mixtures thereof.

There is also provided according to the present invention, an article formed from an asphaltic compound of the type having a polymer modified asphalt component and a filler. The asphaltic compound is improved with respect to the dispersion of the components in the compound, the processing characteristics of the compound and the dimensional and thermal stability and surface characteristics of the article. The improvement includes adding to the asphaltic compound from about 0.1 to about 5 parts by weight of a dispersing agent based upon the total weight of the asphaltic compound.

A method according to the present invention for preparing an asphaltic compound includes compounding from about 70 to about 45 parts by weight of asphalt, from about 15 to about 25 parts by weight of a polymer modifier for the asphalt, from about 15 to about 25 parts by weights of a filler and from about 0.1 to about 5 of a dispersing agent.

The present invention also provides a method of preparing an asphaltic compound which includes compounding a polymer modified asphalt with the reaction product of calcium carbonate and stearic acid. The chemical reaction and compounding preferable take place in situ.

PREFERRED EMBODIMENT FOR CARRYING OUT THE INVENTION

The present invention is directed to a polymer modified asphaltic compound having improved dispersion characteristics, and to improved articles formed therefrom. The compound is improved with respect to the stabilization of polymer network and dispersion of fillers by the incorporation of an amount of a dispersing agent during compounding. It has been found that the resulting material is not only of an improved dispersion uniformity, but that products made from such materials show improved characteristics, most notably improved surface characteristics such as surface sealing, buffing and slip properties and also improved thermal and dimensional stability.

Any conventional asphalt material is useful in the present invention. For example, Ashland Chemical's asphalt designated as AC-5 or AC-10 are useful in the invention. Such asphalts typically contain about 40 to about 52 parts by weight of aromatic hydrocarbons, about 20 to about 44 parts by weight of polar organic compounds, about 10 to about 15 parts by weight of asphaltene, about 6 to about 8 parts by weight of saturates and about 4 to about 5 parts by weight of sulfur. Practice of the present invention is not necessarily limited by selection of a particular asphalt.

Typically, the weight average molecular weight of the aromatic hydrocarbons present in asphalt ranges between about 300 and 2000, while the polar organic compounds, which generally include hydroxylated, carboxylated and heterocyclic compounds, have a weight average molecular weight of about 500 to 50,000. Asphaltenes, which are generally known as heavy hydrocarbons, are of a high molecular weight and are heptane insoluble. Saturates generally include paraffinic and cycloaliphatic hydrocarbons of about 300 to 2000 weight average molecular weight.

The polymer modifier for the asphalt component can be any of those useful for the intended product, and will likely vary depending upon the desired characteristics of the end product. Examples of useful polymer modifiers include polypropylene, propylene-ethylene copolymers, thermoplasticpolyolefins, mixtures thereof and the like. Polypropylene is preferred for roofing membrane applications. Further, the polypropylene can be atactic, isotactic or a mixture of both, as will be exemplified hereinbelow.

As is conventional, the asphalt compound according to the invention is filled. Any conventional filler can be employed, including for example, calcium carbonate, calcium borate, talc, mixtures thereof and the like. The amount of filler will vary depending upon the end use of the compound according to the invention, and hence, it is desirable to use an amount of the filler which is effective for that purpose.

An exemplary polymer modified asphaltic compound includes from about 70 to about 50 parts by weight of asphalt, (more preferably 70 to 45, and more preferred still, from about 69.9 to about 45 parts by weight) from about 15 to about 25 parts by weight of a polymer modifier and from about 15 to about 25 parts by weight of a filler, as those components are described hereinabove.

In order to improve the dispersion of the asphaltic compound components, an amount of a dispersion aid or dispersing agent is added thereto, preferably prior to or during mechanical dispersion operations. Useful dispersing agents include for example, stearic acid, neoalkoxy tri(dioctyl), pyrophosphato titanate, neoalkoxy tri(dioctyl) pyrophosphato, neoalkoxy zirconate tri(dodecyl) benzenesulfonyl titanate, lecithin, aluminum stearate, a maleic anhydride (MAH)-modified polyolefin such as an ethylene/alpha-olefin copolymer, maleic anhydride grafted propylene-ethylene copolymers, a mixture of fatty acids, ethoxylated alcohol, mixtures thereof and the like. Stearic or cetyl acids are preferred. While the amount of dispersing agent will vary depending upon the end use of the compound, one preferred range of amounts is from about 0.1 to about 5.0 parts by weight. If stearic acid is used, about 0.2 parts by weight is preferred.

Stearic acid is generally known to be a mixture of saturated fatty acids, primarily octadecanoic and hexadecanoic acids. It is commercially available from a number of sources and in a number of grades. For example, Witco Chemical Corp. makes stearic acid available under the name Industrin R. Industrin R is a rubber grade stearic acid.

Neoalkoxy tri(dioctyl)pyrophosphato has the following formula

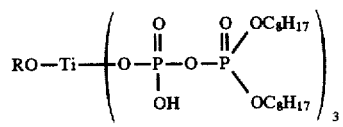

where "RO—" can be any neoalkoxy group containing up to about 20 carbon atoms.

It is commercially available from Kenrich Petrochemicals, Inc., Bayonne, N.J., as LICA 38 where the neoalkoxy group is neopentyl(diallyl)oxy, the formula of which is

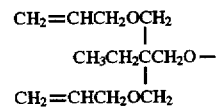

Neoalkoxy tri(dioctyl) pyrophosphato zirconate has the following formula

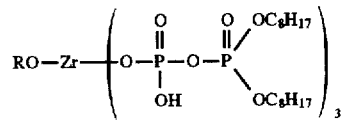

where "RO—" can be any neoalkoxy group containing up to about 20 carbon atoms.

It is commercially available from Kenrich Petrochemicals, Inc. as NZ 38 where the neoalkoxy group is neopentyl (dially)oxy, the formula of which is

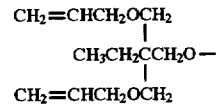

Neoalkoxy tridodecylbenzenesulfonyl titanate has the following formula

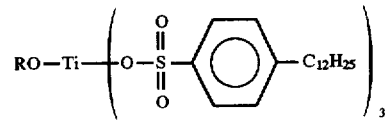

where "RO—"can be any neoalkoxy group containing up to about 20 carbon atoms.

It is commercially available from Kenrich Petrochemicals, Inc. as LICA 09 where the neoalkoxy group is neopentyl (dially)oxy, the formula of which is

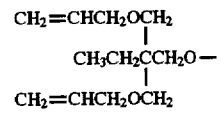

Lecithin is also useful in the present invention. Lecithins are known to have the formula

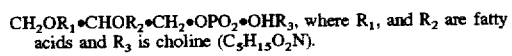

Useful lecithins for practice of the present invention include those available under the names Yelkin and Thermolec from ADM Ross & Rowe, Arthur Daniels Midland Company.

Aluminum stearate, also known as aluminum monostearate, is commercially available, for example, from SYNPRO Synthetic Products Company, Cleveland, Ohio.

Commercially available fatty acid mixtures are also useful in the present invention. For example, Akrochem of Akron, Ohio makes available PROAID 9802 and 9810, which are known to be fatty acid mixtures. Similarly, Henkel Corporation produces EMERY 935 and 400, which are similar mixtures. Emery 935 is known to contain 30 percent by weight of isostearic acid, 28 percent by weight of oleic acid, 26 percent by weight of stearic acid, and 16 percent by weight of miscellaneous C12 to C16 fatty acids. Emery 400 includes 49 percent by weight of palmitic acid, 35 percent by weight of stearic acid, 9 percent by weight of oleic acid, 2.5 percent by weight of myristic acid, and 2 percent by weight of margaric acid. Hence, the dispersing agent can be a mixture of fatty acids having from about 8 to about 22 carbon atoms (C8 to C22).

A modified polyolefin useful as the dispersing agent includes LUCANT A-60206 from Mitsui Petrochemical Industries, Ltd. of Tokyo, Japan. The polyolefin is known to be an MAH-modified ethylene/alpha-olefin copolymer.

Ethoxylated alcohols useful in the invention include those available under the name UNITHOX from Petrolite Corporation of Tulsa, Okla. These alcohols are known to be derived from C30–C50 average carbon length primary alcohols. One preferred UNITHOX alcohol is UNITHOX 480, known to have a typical weight average molecular weight of 2250. The relative hydrophilic and lipophilic portions of the ethoxylated alcohols can be controlled by varying the amount of ethylene oxide present therein. UNITHOX 480 is known to have a typical ethylene oxide content of 80 percent by weight.

The foregoing list of useful dispersion aids is merely exemplary, and is by no means exhaustive. The dispersion aid selected may act as a surface active agent or "surfactant" reducing surface tension between components and improving the dispersion thereof.

It has also been found that asphalt products such as roofing membranes, formed from compounds as described above, have improved characteristics, most notably, improved processing, stability and surface characteristics. Compounds of the invention exhibit increased firmness over compounds without the dispersing aid. The improved firmness allows process speeds to be increased. Also, overall dispersion times are reduced. It is believed that the dispersing aid acts as a wetting agent to promote wetting of the filler materials.

The dispersing aids, which are generally hydrophobic and lipophobic in nature, reduce friction especially during processes involving passage through water, a common procedural step in asphaltic compound processing. This also helps in the prevention of water spots upon the materials.

With respect to products formed from the inventive compounds described herein, improved stability and surface characteristics have been achieved. For example, the surfaces of the articles, such as roofing membranes, have been found to be improved with respect to the sealing, buffing/ bodying, glossing and other similar aspects. It is believed that the dispersing agent reacts with the filler component in situ, to produce oriented chemical species. For example, when the dispersing aid is stearic acid and the filler employed is or includes calcium carbonate, the following reaction to produce calcium stearate is believed to occur in situ:

$$CaCO_3 + 2C_{18}H_{37}COOH \rightarrow (C_{18}H_{37}COO)_2Ca.$$

The polypropylene modified asphalt is basically a nonpolar hydrocarbon. The calcium stearic product of the in situ reaction will orient when chilled with water. That is, the hydrocarbon (fatty long chain) "tail" of the stearate will orient toward the asphalt compound while the polar carboxyl "head" will orient toward the water. The result is an orienled surface on the asphalt compound which effectively seals the material surface, thereby also increasing dimensional and thermal stability. Because of this, products formed from the compounds will show among other things, fewer surface defects as compared to compounds formed without the dispersion aid.

GENERAL EXPERIMENTAL

In order to demonstrate the effectiveness of the asphaltic compounds according to the invention in improving processing line speeds, in achieving improved dispersion of the compound components and in improving other aspects of a product formed from the compound, a number of tests were conducted as will be reported hereinbelow. In each of the tests as reported herein, an asphaltic compound containing 57.5 parts by weight of asphalt, 18 by weight of polypropylene, 4.5 parts by weight of isotactic polypropylene and 20 of calcium carbonate was prepared. This compound will be referred to as the "Regular Batch".

The Regular Batch was mixed for 4 ½ hours in a low speed mixing tank at 190° C. At the end of the mixing time, a sample of the compound was reviewed under 20x magnification. Rather large agglomerates were noted which is an indication of inadequate dispersion of calcium carbonate.

EXAMPLE 1

A similar Regular Batch was prepared and 0.2 percent by weight based upon the total weight of the compound of stearic acid was added thereto. After 4 hours of mixing, microscope observation showed very thorough dispersion. The polymer network, when viewed under ultra violet microscopy, was ordered and well organized.

The stearic acid modified batch of Example No. 1 was also tested for tensile strength and elongation percent. The results of this test are reported in TABLE I hereinbelow.

TABLE I

| TENSILE AND ELONGATION TESTS | | |
|---|---|---|
| | Tensile (lbs.) | Elongation Percent |
| MD[1] at 72° F. | 96.5 | 45.9 |
| CD[2] at 72° F. | 69.3 | 55.2 |
| MD at 0° F. | 153.4 | 14.1 |
| CD at 0° F. | 78.9 | 10.4 |

[1]MD = "machine direction"
[2]CD = "cross-machine direction"

The modified inventive batch of Example No. 1 was also tested for tear resistance. In the machine direction the force was 109.86 pound with a strain on the sample of 736.5 pounds per inch. In the cross machine direction the force in pounds at tear was 138.28 pounds and the strain on the sample was 930.5 pounds per inch.

EXAMPLE 2

Inventive compound properties were also determined by preparing a stearic acid modified batch as in Example No. 1 and by examining a sample of the batch under microscope and taken every 5 minutes during mixing. The test results showed no visual contaminations of any kind which might be caused by adverse reactions. The batch clearly showed a superior line process performance and the material was observed to be glossier with better well defined edges and seem to have more strength as compared to the Regular Batch. Furthermore, the water marks normally associated with higher line speeds due to insufficient cooling were much less pronounced in the stearic acid modified batch. Other properties of the compound are reported in TABLE II hereinbelow.

TABLE II

STEARIC ACID MODIFIED BATCH PHYSICAL PROPERTIES

| Avg.[3] Compound Viscosity | 3540 cps[4] |
|---|---|
| Avg. Compound Softening Agent | 150° C. |
| Avg. Finished Product Width | 100.8 cm |
| Avg. Compound Temperature | 198° C. |
| Avg. Roll weight | 90.4 lbs. |

[3]Avg. = average
[4]cps = centipoise

This experimental batch showed a clearly superior on-line process performance as well as further improvements in the finished product as compared to the asphaltic compounds without surfactant e.g., stearic acid. Due to these improvements, line speed efficiency was increased by over 20 percent.

EXAMPLE 3

The dimensional stability of a membrane formed from the inventive composition of Example No. 1 was determined following ASTM D5147-91. Four separate invention batches were prepared using two different stearic acids, as well as two lecithins. For comparison, two Regular Batches were also tested. The results of these tests are reported hereinbelow. Sample Nos. 1 and 2 were prepared with an asphaltic compound substantially as in Example No. 1 hereinabove but modified with 0.2 percent by weight of lecithin, namely, Yelkin TS; Sample Nos. 3 and 4 contain 0.2 weight percent of stearic acid, namely, Industrin R; Sample Nos. 5 and 6 are Regular Batch samples. Results of the tests are reported in TABLE III hereinbelow.

TABLE III

DIMENSIONAL STABILITY ANALYSIS

| Position[5] | SAMPLE | | | | | |
|---|---|---|---|---|---|---|
| | 1 | 2 | 3 | 4 | 5 | 6 |
| A–B ($D_f$–$D_c$) | −0.32 | −0.32 | −0.5 | −0.5 | −0.8 | −0.5 |
| Avg.$^{A-B}$ percent | | | | | | |
| X–Y ($D_f$–$D_c$) | +0.5 | +0.5 | +0.65 | +0.5 | +0.5 | +0.32 |
| Avg.$^{X-Y}$ percent | | | | | | |

[5]According to ASTM D5147-91

These dimensional stability tests clearly indicate that the samples according to the present invention showed either comparable, or in most instances, improved results in the finished materials as compared to the asphaltic compositions without the stearic acid or lecithin modification.

EXAMPLE 4

The lecithin and stearic acid modified asphaltic compounds of Example No. 3 were also tested for H.T.S. at 280° F. and L.T.F. at −19° C. H.T.S. is "high temperature stability" where 2"×3" coupons will not sag or drip for 2 ¼ h at a specified temperature. L.T.F. is "low temperature flexibility" where 1"×6" coupons will not crack over a 1 inch mandrel kept at a specified temperature for 2 ¼ h. The H.T.S. and L.T.F. results show about 20° F. to 30° F. improvement in H.T.S. and no change in L.T.F. by using stearic acid.

EXAMPLE 5

A number of comparative tests were also conducted using the various dispersion aids as discussed hereinabove. With 0.2 percent of Industrin R or purified stearic acid (available from Fisher Scientific) the compounds showed very uniformed dispersion of the components therein. Aluminum stearate 505 (Synpro Synthetic Products Company) at 0.2 percent by weight showed uniform dispersion with only minor agglomerates. Similarly, zinc stearate at 0.2 weight percent also showed uniform dispersion with minor agglomerates. Yelkin TS and Thermolec 200 at 0.28 percent showed uniform dispersion with minor agglomerates. Lucant at 0.3 weight percent showed uniform dispersion. Emery 935 fatty acid, Ken React Lica 09, Ken React Lica 38, Ken React NZ 38 and Unithox 480, all at 0.2 weight percent showed uniform dispersion with minor agglomerates. Proaid 9810 and 902 both at 0.2 weight percent showed good dispersion with slightly larger agglomerates as compared to the other dispersion aids.

EXAMPLE 6

Polypropylene-modified membranes substantially according to the Regular Batch, but employing atactic polypropylene and only 3 percent by weight of isotactic polypropylene, were prepared and heat treated at 70° C. for 2 months. After 2 weeks, oil-like liquid was observed to be dripping from the membranes. The dripping became more pronounced after 4 weeks. Compound flow, sag and form instability of the membrane were also observed. When modified with 0.2 weight percent of stearic acid and heat treated in a similar manner, no dripping was observed after 4 weeks, and the membranes maintained their form stability. These observations confirm the sealing, dimensional stability and thermostability characteristics of the products according to the present invention.

It is clear from the foregoing examples and specification disclosure that the dispersion aid-modified asphaltic compounds and products of the present invention exhibit improved characteristics, including improved line processing speeds and improved product stability and surface characteristics. It is to be understood that the invention is not necessarily limited to the specific asphaltic compounds, polymer modifier, fillers and or dispersion aids disclosed herein. Similarly, the examples have been provided merely to demonstrate practice of the subject invention and do not necessarily constitute limitations of the invention. Those skilled in the art may readily select asphaltic compound components and process conditions, according to the disclosure made hereinabove.

Thus, it is believed that any of the variables disclosed herein can readily be determined and controlled without departing from the scope of the invention herein disclosed and described. Moreover, the scope of the invention shall include all modifications and variations that fall within the scope of the attached claims.

What is claimed is:

1. A method of improving the dispersion of filler in a polymer modified asphaltic compound comprising:
   blending from about 15 to about 25 parts by weight of a filler with from about 0.1 to about 5 parts by weight of a dispersing agent;
   allowing said filler and said dispersing agent to react to produce an oriented reaction product;

blending from about 70 to about 45 parts by weight of asphalt with from about 15 to about 25 parts by weight of a polymer modifier to form a polymer modified asphalt; and, blending said oriented reaction product with said polymer modified asphalt to produce a filled, oriented asphaltic compound.

2. A method as in claim 1, including the additional step of forming said polymer modified asphaltic compound into a membrane.

3. A method as in claim 2, wherein said polymer modifier is selected from the group consisting of polypropylene, propylene-ethylene copolymer, thermoplastic polyolefin, and mixtures thereof.

4. A method as in claim 3, wherein said polypropylene is selected from the group consisting of atactic polypropylene and isotactic polypropylene and mixtures thereof.

5. A method as in claim 4, wherein said polymer modified asphalt contains about 18 percent by weight atactic polypropylene and about 4.5 percent by weight of isotactic polypropylene.

6. A method as in claim 1, wherein said filler is selected from the group consisting of calcium carbonate, calcium borate, talc, and mixtures thereof.

7. A method as in claim 1, wherein said dispersing agent is selected from the group consisting of stearic acid, neoalkoxy tri(dioctyl) pyrophosphato titanate, neoalkoxy tri(dioctyl) pyrophosphato zirconate, neoalkoxy tridodecylbenzenesulfonyl titanate, lecithin, aluminum stearate, maleic anhydride-modified ethylene/alpha-olefin copolymer, maleic anhydride grafted propylene-ethylene copolymer, ethoxylated alcohol, and mixtures thereof.

8. A method as in claim 1, wherein said dispersing agent is a mixture of fatty acids having from about 8 to about 22 carbon atoms.

9. A method of improving the dispersion of filler in a polymer modified asphaltic compound comprising:

blending from about 15 to about 25 parts by weight of a filler with from about 0.1 to about 5 parts by weight of a dispersing agent;

allowing said filler and said dispersing agent to react to produce an oriented reaction product;

blending from about 70 to about 45 parts by weight of asphalt with from about 15 to about 25 parts by weight of a polymer modifier to form a polymer modified asphalt;

blending said oriented reaction product with said polymer modified asphalt to produce a filled, oriented asphaltic compound; and forming an article from said oriented asphaltic compound, said article having improved dimensional and thermal stability and surface properties compared to articles prepared from filled, non-oriented asphaltic compounds.

10. A method as in claim 9, including the additional step of forming said polymer modified asphaltic compound into a membrane.

11. A method as in claim 9, wherein said polymer modifier is selected from the group consisting of polypropylene, propylene-ethylene copolymer, thermoplastic polyolefin, and mixtures thereof.

12. A method as in claim 11, wherein said polypropylene is selected from the group consisting of atactic polypropylene and isotactic polypropylene and mixtures thereof.

13. A method as in claim 12, wherein said polymer modified asphalt contains about 18 percent by weight atactic polypropylene and about 4.5 percent by weight of isotactic polypropylene.

14. A method as in claim 9, wherein said filler is selected from the group consisting of calcium carbonate, calcium borate, talc, and mixtures thereof.

15. A method as in claim 9, wherein said dispersing agent is selected from the group consisting of stearic acid, neoalkoxy tri(dioctyl) pyrophosphato titanate, neoalkoxy tri(dioctyl) pyrophosphato zirconate, neoalkoxy tridodecylbenzenesulfonyl titanate, lecithin, aluminum stearate, maleic anhydride-modified ethylene/alpha-olefin copolymer, maleic anhydride grafted propylene-ethylene copolymer, ethoxylated alcohol, and mixtures thereof.

16. A method as in claim 9, wherein said dispersing agent is a mixture of fatty acids having from about 8 to about 22 carbon atoms.

17. A method of decreasing the processing time of filled, polymer modified asphaltic compounds comprising:

blending from about 15 to about 25 parts by weight of a filler with from about 0.1 to about 5 parts by weight of a dispersing agent;

allowing said filler and said dispersing agent to react to produce an oriented reaction product;

blending from about 70 to about 45 parts by weight of asphalt with from about 15 to about 25 parts by weight of a polymer modifier to form a polymer modified asphalt; and blending said oriented reaction product with said polymer modified asphalt to produce a filled, oriented asphaltic compound.

18. A method as in claim 17, including the additional step of forming said polymer modified asphaltic compound into a membrane.

19. A method as in claim 17, wherein said polymer modifier is selected from the group consisting of polypropylene, propylene-ethylene copolymer, thermoplastic polyolefin, and mixtures thereof.

20. A method as in claim 19, wherein said polypropylene is selected from the group consisting of atactic polypropylene and isotactic polypropylene and mixtures thereof.

21. A method as in claim 20, wherein said polymer modified asphalt contains about 18 percent by weight atactic polypropylene and about 4.5 percent by weight of isotactic polypropylene.

22. A method as in claim 17, wherein said filler is selected from the group consisting of calcium carbonate, calcium borate, talc, and mixtures thereof.

23. A method as in claim 17, wherein said dispersing agent is selected from the group consisting of stearic acid, neoalkoxy tri(dioctyl) pyrophosphato titanate, neoalkoxy tri(dioctyl) pyrophosphato zirconate, neoalkoxy tridodecylbenzenesulfonyl titanate, lecithin, aluminum stearate, maleic anhydride-modified ethylene/alpha-olefin copolymer, maleic anhydride grafted propylene-ethylene copolymer, ethoxylated alcohol, and mixtures thereof.

24. A method as in claim 17, wherein said dispersing agent is a mixture of fatty acids having from about 8 to about 22 carbon atoms.

* * * * *